MEMORY SYSTEMS

Filed March 16, 1951 2 Sheets-Sheet 1

INVENTORS
JOHN D. GOODELL
TENNY LODE
BY Robert M. Dunning
ATTORNEY

Oct. 1, 1957 J. D. GOODELL ET AL 2,808,578

MEMORY SYSTEMS

Filed March 16, 1951 2 Sheets-Sheet 2

INVENTORS
JOHN D. GOODELL
TENNY LODE

BY Robert M. Dunning
ATTORNEY

United States Patent Office 2,808,578
Patented Oct. 1, 1957

2,808,578

MEMORY SYSTEMS

John D. Goodell and Tenny Lode, St. Paul, Minn., assignors, by mesne assignments, to Librascope, Incorporated, a corporation of California Application March 16, 1951, Serial No. 216,032

25 Claims. (Cl. 340—174)

This invention relates to progressive memory systems and pertains more particularly to a system including a magnetic material capable of assuming more than two stable magnetic states for the storage and/or handling of information.

At the present time there are a number of various systems in existence for the storage and handling of information. Included in these systems are electron tube circuits, electrostatic recording systems, magnetic recording systems, mechanical devices and systems using magnetic materials having bi-stable characteristics. Our system falls into the latter group, it being a static memory device which possesses the advantage of not requiring power for the maintenance of the stored information.

One important object of the instant invention is to provide a memory system having a relatively high storage capacity with respect to the size and number of elements constituting the system.

Another important object is to provide a system of the foregoing character having a high speed of operation.

Another object is to produce a system possessing the ability to accept, retain and reproduce numbers or other information represented by a variety of continuously variable signal dimensions, such signal dimensions involving magnitude, duration, wave form, area and the like. Accordingly, it may be said that our system combines the principal features of both analog and digital computers.

Another object is to provide a system possessing the ability to accept, retain and reproduce numbers or other information which may be represented by a variety of signals which may be introduced in a form such that they will be added or in such a form that they will be subtracted from the total information stored.

Still another object of the invention is to provide a computing system that can be constructed at a relatively low cost and which requires only simple associated apparatus.

Further objects and advantages of the invention may best be reserved for later discussion, and still other advantages not specifically mentioned will be apparent from a reading of the following specification and the accompanying drawings, in which.

Figure 2:
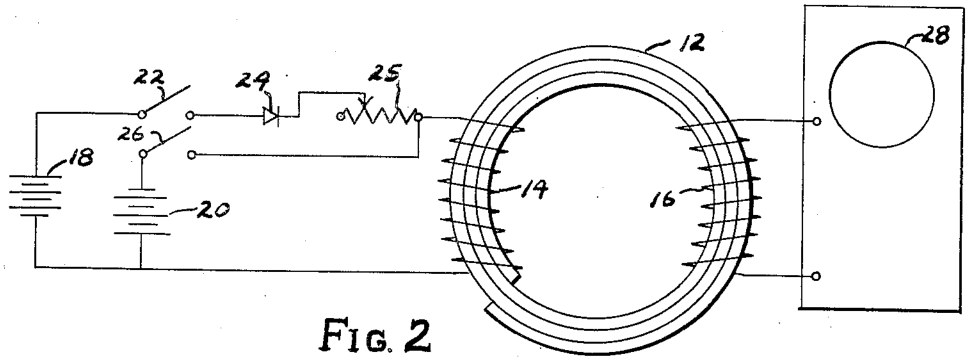
Figure 2 is a schematic diagram illustrating a fundamental application of the invention.

While there are many possible configurations using the principles embodied in our invention, the following discussion of the principles involved includes a description of only several practical embodiments or configurations. As a basis for an understanding of the invention, it will be appreciated that that the degree and direction of magnetization of a magnetic material are a function of its past history, particularly with respect to magnetized forces, as well as the magnetizing forces applied at the time under consideration. The process of magnetization is conveniently accomplished through the application of electric currents passed through a helix surrounding the magnetic material. In this process the flux density through the magnetic medium will be altered appreciably when the applied magnetic force exceeds the coercive force of the material. It is well known that magnetic cores produce a changing magnetic flux when a voltage is applied to a winding supported on the core. If a voltage is applied to the winding for a sufficient period of time, the core may become magnetically saturated. The core becomes magnetically saturated with flux of a negative polarity when a voltage of a first polarity is applied to the winding on the core for a particular period of time. The core becomes magnetically saturated with flux of a positive polarity when the same voltage of the opposite polarity is applied to the winding for the same length of time.

During the time that a core is not saturated, it produces increasing amounts of flux as a voltage of one polarity is applied. For certain core materials such as that used in the cores of this invention, small increases in current through the winding above a particular value may cause large increases in the rate at which the magnetic flux changes. Since the rate of change of flux is related to electromotive force—in other words, voltage—a relatively large increase in voltage can be produced by a relatively small increase in current (incremental magnetizing current) when the core remains relatively unsaturated. This may be seen by the steep sides of the curve 10 shown in Figure 1, such sides being designated as 100 and 102.

For certain core materials the steep sides of the curves 100 and 102 may actually approach a vertical slope. Under such conditions, the flux would change from one polarity of saturation to the other upon the continued application of a current of substantially constant amplitude, provided that the current has a sufficient minimum value to produce an exciting flux. This may be seen from the fact that values of current are represented along the horizontal axis of the curve shown in Figure 1 and values of flux may be considered as being represented along the vertical axis. Since the current may remain substantially constant during changes in flux along the portions 100 and 102, the duration of the current would provide an indication as to the particular changes in flux at any instant.

When a core becomes magnetically saturated, increases in current through its associated winding produce substantially no increase in magnetic flux. Because of the lack of any increase in flux in the core, no voltage is induced in the winding. This may be seen by the horizontally flat portions 104 and 106 in the response curve 10 shown in Figure 1. Since the portions 100 and 102 of the curve shown in Figure 1 are substantially vertical and the portions 104 and 106 are substantially horizontal, the curve has a configuration which approaches a rectangle.

The performance of a magnetic core at any instant is dependent upon certain characteristics of the core. For example, the performance of the core is dependent among other factors upon the cross-sectional area of the core and the magnetic material from which the core is made. The characteristics of the core in turn determine how long a period of time is required to change the core from a negative saturation to a positive saturation or to any intermediate value between the positive and negative saturations when a particular voltage is imposed on a winding magnetically coupled to the core. Increases in voltage above a particular amplitude result in a substantially proportionate decrease in the time required to change the polarity of core saturation. The particular amplitude of voltage is that required to produce the current indicated along the response portions 100 and 102 of the curves shown in Figure 1. Similarly, increased periods of time are required to saturate a core for decreases in voltage applied to the associated winding as long as the voltage remains greater in amplitude than the particular value. Such increases in the time required for core saturation are substantially proportionate to the decreases in the applied voltage.

Figures 1, 3, 4, 5, 6:
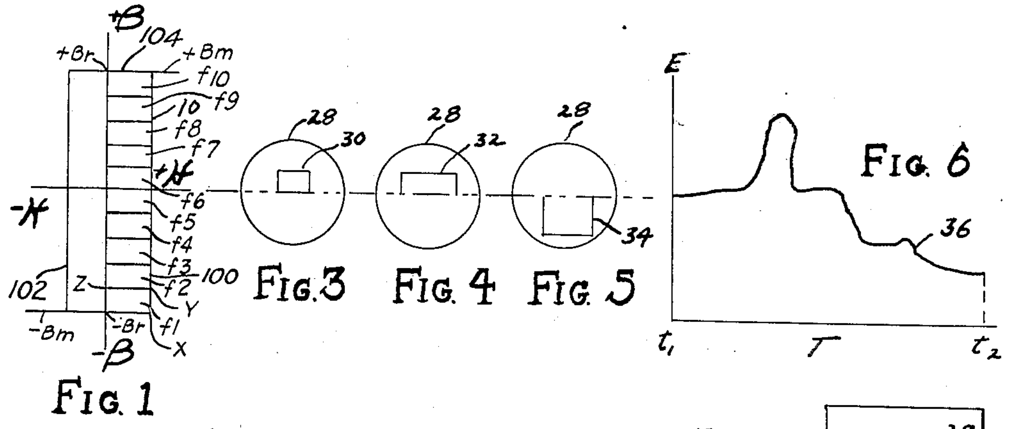
Figure 1 is a preferred hysteresis curve for the magnetic material employed.
Figures 3–6 are various wave shapes that may be employed in practicing the invention.

The combination of voltage and time required to convert a core from one polarity of saturation to the opposite polarity of saturation has been defined as the "volt-seconds capacity" of the core. The term "volt-seconds" can be mathematically described as the integral of voltage with respect to time. Thus, $$\text{Volt-seconds}=\int_0^t V dt$$

where $V$=the voltage at any instant provided that the voltage has an amplitude above the particular value required to produce the currents indicated at 100 and 102 in Figure 1; and $dt$=an infinitesimal increase in time from that instant.

Since the flux level of a core at any instant is dependent upon the value of the volt-seconds which have been applied through an associated winding previous to that instant, the curve shown in Figure 1 can be considered to represent the relationship between current and volt-seconds, as well as the relationship between current and flux. The value of the current is represented along the horizontal axis of the curve shown in Figure 1, and the amount of volt-seconds is represented along the vertical axis. As will be seen in Figure 1, the portions 100 and 102 are relatively steep and the portions 104 and 106 are relatively flat such that a response curve approaching a rectangle is produced. Such a response curve is desirable for reasons which will become apparent in the subsequent discussion.

At a particular instant, a sufficient amount of volt-seconds may be applied to the core 12 through one of the windings such as the winding 14 so as to change the flux level of the core from the level $-B_r$ to the level Y in the curve 10 shown in Figure 1. After the volt-seconds have been applied to the core 12 through the winding 14, the current flowing through the winding 14 in Figure 2 returns to "0." At such times, the flux in the core changes from the position Y to the position Z. As may be seen in Figure 1, the position Z has a flux level approaching that of the position Y. It may be seen from this example and from other examples that the remanent flux in the core at any instant after the application of volt-seconds to the core approaches the value of the volt-seconds applied to the core.

The characteristics of flux remanence described in the previous paragraph is important in the operation of the embodiments shown in the drawings and hereafter described in detail in indicating the amount of volt-seconds applied at any instant to a core.

For example, since the volt-seconds stored in the core 12 is closely related to the volt-seconds applied to the core, the amount of volt-seconds subsequently applied to the core to obtain saturation may indicate the amount of volt-seconds previously stored in the core. In this way, by applying a constant voltage, the duration of the voltage before saturation of the core may indicate the amount of volt-seconds previously stored in the core.

It is the essence of this invention that the electromotive force need not be continuously applied during the time interval under consideration, that is, the applied voltage may vanish to zero during finite portions of this time interval. If the electromotive force is applied in the form of pulses, the total change in flux density is directly proportional to the number, magnitude and duration of the individual pulses. The change effected by a single pulse is directly proportional to the integral of the pulse area, and it will be obvious from this that the change effected by a single pulse is determined by the pulse wave form.

It will be appreciated that in practical applications a variety of magnetic materials may be employed. Moreover, the linearity of the system may be degraded by the relaxation of the conditions assumed in the above description, although the gross effect remains the same. In some applications it may be desirable to vary the performance characteristics by varying the magnetic characteristics of the magnetic material used.

Referring now to Figure 2, which figure represents one possible configuration of the invention, it will be seen that this arrangement comprises a toroidal core 12 wound with two wire coils 14 and 16. The core 12 is made of a magnetic material possessing the magnetic characteristics resulting in an approximation of the curve 10. For example, the core 12 may be formed by winding a magnetic ribbon annularly through a plurality of turns to from a toroid similar to that shown in Figure 2.

In order to obtain a rudimentary functioning of the parts 12, 14 and 16, certain associated apparatus is utilized. This apparatus includes a pair of batteries 18 and 20 connected to be applied in opposite polarity to the coil 14. In circuit with the battery 18 is a switch 22 and rectifier 24 and a rheostat 25 designed to pass current from the battery 18 to the coil 14, while in circuit with the battery 20 is a switch 26. The purpose of the rheostat 25 is to afford a facile means for compensating for slight deviations in the magnetic properties of any different cores which may deviate somewhat from a true standard core 12. Connected to the coil 16 as a cathode ray tube 28 for reading out the stored information.

In operation, the switch 26 is initially closed for a sufficient period of time to allow the current from the battery 20 to magnetize the magnetic core 12 to a limiting state in one direction. Ideally, this limiting state would be complete magnetic saturation of the core in one direction. With practical materials currently available, the remanence will be somewhat less than complete saturation and, although the dynamic limiting state may be magnetic saturation, the static limiting state will be the remanence of magnetization of the core when the saturating magnetic force is removed. The dynamic limiting states are designated in Fig. 1 as $-B_{max}$ and $+B_{max}$. The static limiting states are $-B_r$ and $+B_r$, the subscript $r$ representing "remanence." The state $-B_r$ is taken as an initial zero or datum point produced as a function of closing the switch 26 for an adequate period of time as heretofore stated. This provides a zero or datum point. The switch 26 is then opened, and the switch 22 is closed briefly one or more times. Each time the switch 22 is closed a voltage pulse is applied to the coil 14. The net change in the magnetic state of the core 12 each time the pulse is applied is directly proportional to the integral of the applied pulse, hence to the duration of the pulse since the source 18 is a constant voltage. The rectifier 24 is used for the purpose of eliminating any oscillatory disturbances that might arise as a result of shunt capacity in the circuits. Each time a pulse is applied from the battery 18, the magnetization of the core 12 is moved in the direction of saturation, opposite in sense to the direction of the limiting state produced by the application of current from the battery 20, and each time the magnetic state of the core 12 is altered the derivative of the flux change appears as a voltage across the coil 16. A pulse designated as the $n$th pulse will produce dynamic saturation of the core 12 in the sense opposite to that produced initially. Further application of voltage pulses from the battery 18 can no longer produce a significant flux change in the core because it is in its static limiting state of remanence and the only flux change possible as a result of voltage pulses from the battery 18 is the relatively small increment of change from static limiting remanence $+B_r$ to dynamic magnetic saturation $+B_m$. Hence, no significant output pulse will be developed across the coil 16, and this fact may be used as an indication that a limiting state has been reached. More precisely, in the case of materials with a less than perfect rectangular hysteresis characteristic curve, the definite integral of the output pulse vanishes, and the essential character of the output pulse is appreciably altered when the limiting state has been attained.

As an example view the magnetic flux in the state $-B_r$ and the successive conditions of the flux as successive voltage pulses ($p_1, p_2, p_3, p_4, p_5, p_6, p_7, p_8, p_9, p_{10}$) in Fig. 1, each having the same integral (e. g. Fig. 3) are applied. When the first pulse ($p_1$) is applied the flux will traverse the path on the hysteresis curve in Fig. 1 from $-B_r$ to $x$, thence thru Y to Z enclosing the area $f$. Z now represents a new stable state of remanent flux. Each successive pulse, $p_2 \ldots p_{10}$ produces a similar flux change for the corresponding areas $f_2, f_3 \ldots f_{10}$. When $p_{10}$ has been applied the remanent flux is at $+B_r$. Further pulses applied in the $+B$ sense cannot produce any further change in flux, hence cannot be coupled to the output winding 16.

At any time during the cycle just described, providing the switch 22 is open, the switch 26 may be closed. This will produce a flux change in the core 12 which is equal in magnitude and opposite in direction to the sum of the flux changes produced by the input pulses. This generates an output voltage across the coil 16, the integral of which is proportional to the sum of the individual integrals of the input pulses that have been previously applied to the coil 14. The cathode ray tube 28 provides a means for observing the output voltage generated across the coil 16.

For example, the curve 30 represented in Figure 3 may denote one impulse as observed across the coil 16, while the curve 32 in Figure 4 designates a second input pulse as observed across the coil 16. Assuming for the sake of brevity that only the two input pulses have been applied, then a curve 34 appearing in Figure 5 represents the reset pulse that returns the systems to zero, this pulse also representing the sum of the information that has been stored in the core 12 by the application of the pulses 30 and 32.

The configuration pictured in Figure 2 describes the basic elements necessary for a desirable counter using our invention. Means are shown and described for the application of coded information to the magnetic memory, for reading out the accumulated information at any time, for observing the time at which the accumulated information has reached a predetermined value (limiting state such as saturation or maximum remanence) and for re-setting the memory to the previously defined zero.

It should be noted that by varying the polarity of the applied pulses the processes of both addition and subtraction may be performed within the magnetic memory. Although the above description has been in terms of discrete pulses, it is clear that an extension may be made to include the class of continuous bounded functions. A signal of this kind is represented at 36 in Figure 6, the voltage E being plotted as the ordinate and the time T as the abscissa to show a continuous function extending over the period $t_1$ to $t_2$.

In the preceding discussion the voltage serving to re-set the system has been referred to as being a single pulse, exemplified by the wave 34 in Figure 5. However, in some instances it may be found desirable to break up the re-set impulse into a series or stream of smaller impulses of known magnitude, whereupon the corresponding output pulses, or their definite integrals, may be readily counted to determine the quantity of stored information previously fed into the core 12. Such a stream of re-set impulses would be of utility, for example, in ascertaining the area beneath the curve 36 of Figure 6, or in operating some auxiliary circuit in which the re-set impulses would serve as a schedule for securing a desired result dependent upon the quantity of stored information. In this connection it will, of course, be understood that the stream of re-set impulses may first cause de-magnetization of the core 12 and then continue to magnetize the core in a reverse direction from that produced by the original input impulses or unbroken variable function impressed on the core to produce again the previously mentioned zero relation or datum. An immediate application of this latter procedure will be found in the case where the number of significant output pulses is equal (or proportional) to the number of input pulses provided said input pulses did not exceed the number required to magnetize the magnetic material to a limiting state. It has previously been mentioned that when the core of magnetic material has been magnetized to a limiting state, the application of signals in the sense of the limiting state that has been produced may still be observed in the output circuits as a result of air coupling between the coils, the flux change possible in practical core materials when the remanence is slightly less than dynamic saturation or as a result of other factors. The term "significant" output pulse or pulses is herein intended to denote output signals characterized in one or more dimensions by a flux change taking place during transition from one limiting state toward another limiting state, and prior to the condition of saturation or maximum remanence. Ordinarily the observation of such pulses will be in terms of relative magnitude, but for certain applications the output signals may be integrated or otherwise altered for ease or convenience of observation or application to special circuitry. This may be accomplished by means of conventional R/C integrating networks, ballistic devices such as current indicating meters, electron tube circuitry, coincidence or anti-coincidence circuits, the application of various types of loading to the core, and by other means.

The preceding description has been confined to an operational sequence in which the magnetic state of the core element 12 is returned to its initial or zero limiting state in order to read out the stored information. However, it should be understood that it is possible to read out the quantity of stored information by continuing to magnetize the core element 12 away from the initial limiting state or previously defined zero to a limiting state of magnetization opposite in sense to the initial limiting state. Knowing the total amount of magnetization required to change the element 12 from a limiting state in one direction to a limiting state in an opposite direction, it is then simply necessary to subtract the amount of magnetization required to change the element from its stored level of information to its second limiting state from the amount necessary to effect the aforesaid complete change from one limiting state to another limiting state. It will also be appreciated that it is within the confines of the invention to establish known reference points or levels of magnetization other than limiting states of magnetization, as long as either a return to one reference state can be effected or an advance from the stored state to a second known reference state can be accomplished.

From the foregoing it will be observed that the configuration shown in Figure 2 may be used as a counter, as an integrator, as an accumulator and for various other applications. Obviously many other configurations with characteristics required by various applications may be designed using these basic principles. One of the extremely important features of this invention is the fact that the system bridges the gap between digital and analog computation, making it possible to combine desirable characteristics of each system in the performance specifications of a single device.

Figure 7:
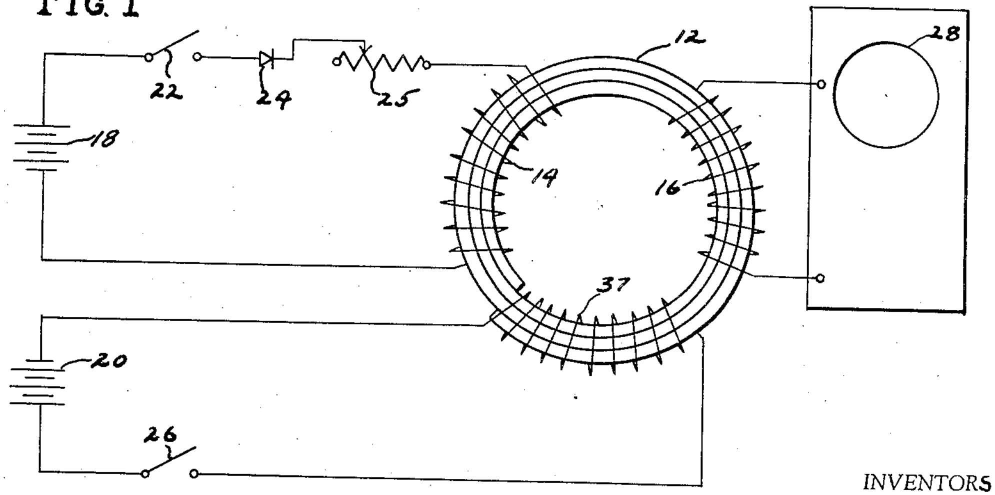
Figure 7 is similar to Figure 2 but representing a slightly modified arrangement.

In the embodiment depicted in Figure 2 there has been illustrated a system in which the coil 14 is used for magnetizing the core 12 to a limiting state by means of the battery 20, the same coil also being used for introducing the information characteristics, such as the pulses 30 and 32, by means of the battery 18. Also, in resetting or returning the core 12 to its zero level or limiting state of one polarity, the coil 14 has been again used. In Figure 7 there is presented a slightly modified arrangement in which a third coil 37 is employed for first producing a limiting condition, which has been referred to as a zero condition. The same battery 20 and switch 26 are utilized in this arrangement and function in the same previous manner to produce the initial limiting state of the core 12, and the re-set to the initial limiting state after information has been stored in the core 12 by the battery 18, the pulse (or pulses) necessary to return the core to its initial limiting state being an indication of the amount of information stored and which may be determined from the output signal appearing at the coil 16 by means of the cathode ray tube 28 or other indicating means.

Figure 8:
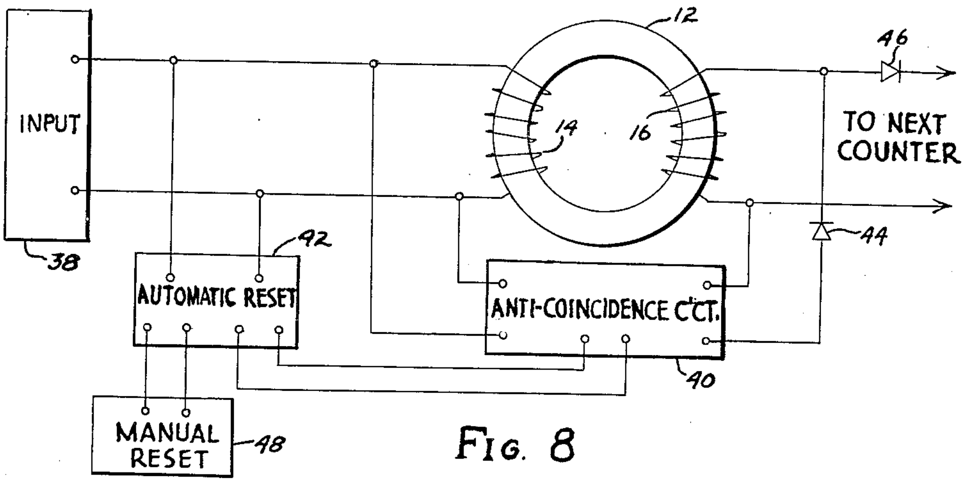
Figure 8 is a schematic representation of the system as adapted for cascade operation.

In the configuration shown in Figure 8 the memory system is identical in characteristics to that shown and described in Figure 2. However, the instant configuration is intended to illustrate a method of applying the device to situations where it is desirable to cascade counting operations. A typical application is in connection with devices operating in accordance with conventional decimal notation and each memory system represents a decade counter.

Quantized input pulses in the form of discrete specific digital units are applied to the coil 14 of Figure 8 from an input source 38. When the number of pulses necessary to achieve saturation in the counting sense have been applied, that is, nine pulses for a decade type unit, the next input pulse from source 38 will produce no significant output pulse across the coil 16. The input pulses and the output pulses from the coil 16 are compared by means of an anti-coincidence circuit 40 in such manner that an output from the coincidence circuit requires that only the input pulse be significantly present. Thus, when saturation is reached in the counting sense, the absence of a significant output pulse from the coil 16 at the anti-coincidence circuit 40 causes a pulse to be applied to an automatic re-set circuit 42. The re-set pulse as observed at the coil 16 will be of opposite polarity to those pulses appearing in the counting operation from "one" through "nine." A rectifier 44 is employed to reject the re-set pulse, and a rectifier 46 rejects the counting pulses from one through nine, these selective rejections being effected by virtue of the opposite polarities used in counting and re-setting.

The re-set pulse returns the magnetic material 12 to a limiting condition in the zero sense and simultaneously produces an output pulse that passes through the rectifier 46. The output pulse produced by the re-set pulse is a measure of the quantity stored in the core 12 and may be applied to a succeeding counter in the sense of the decimal notation, the output pulse from the coil 16 produced by application of the re-set pulse then serving as an input pulse to the succeeding counter which counter may be of similar construction as the system just described. In some systems it may be necessary or desirable to provide suitable circuitry for re-quantizing the pulse passed on to a succeeding memory unit. An external manual re-set 48 may be provided, and at the end of any arbitrary time period the total number stored in the cascaded memory systems may be observed and evaluated in terms of the output pulse produced by the se-set pulse applied from an external source. This exterior re-set pulse, or alternatively a stream of pulses of known dimensions which will produce significant output pulses which may be counted, would correspond in characteristics to the embodiment of Figure 2 and the readout system would also be such as is described with respect to Figure 2. The re-set may be a powered circuit that is simply triggered by the input from the anti-coincidence circuit or the external source.

Figure 9:
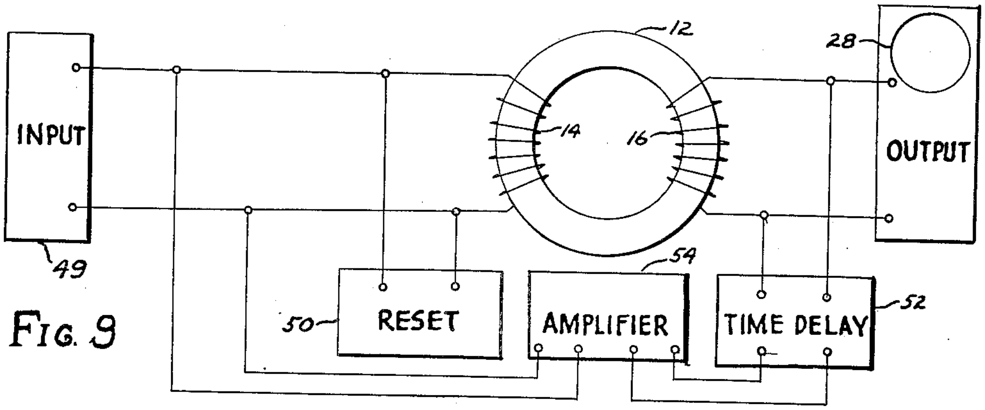
Figure 9 depicts an arrangement for observing and restoring the information desired to be retained.

In Figure 9 there is depicted a system in which the magnetic memory configuration is also comparable to Figure 2 with regard to performance characteristics. The arrangement of Figure 9 represents a system using this magnetic memory with suitable external circuitry to make it possible to observe the information stored in the memory at any time and automatically re-insert the information. Assuming that information has been stored in the core 12 from an input source 49 of Figure 9 and that it is desired to observe this stored information, a re-set pulse or pulse train is applied from a re-set source 50 which produces an output pulse across the coil 16. This can be observed in accordance with the principles described earlier. This pulse or pulse train is applied through a time delay element 52 to an amplifier 54, which is designed to compensate for losses in the system, and is then reinserted as an input pulse across the coil 14. This restores the original information stored in the magnetic memory before the re-set pulse was applied for purposes of observation. When a permanent re-set is desired, the reinsertion circuits may be disabled and the output read in the normal manner. In certain digital computer applications it may be desirable to effect a requantifying of the information in the process of restoration. This may be accomplished in the circuits of the amplifier 54 by various means such as triggered circuits specialized with respect to discrete digital numbers. Thus, an output signal corresponding to a value greater than 7.5 but less than 8.5 would trigger a circuit that produced a restoring signal corresponding to 8.

Figure 10:
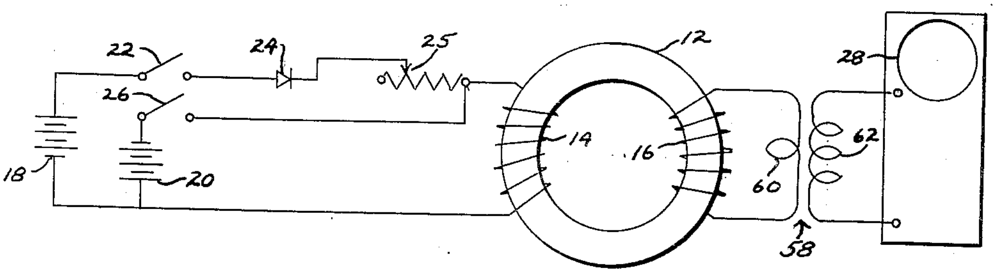
Figure 10 is similar to Figure 2, being adapted for current operation rather than for voltage operation.

It should be mentioned that current pulses from a constant current source may be used in this invention. In this mode of operation a current sufficient to produce a magnetizing force greater than the coercive force of the material 12 is applied to the input coil 14. In this instance the output coil 16 constitutes a low resistance loop, and the current induced therein is of a magnitude such as to reduce the net magnetizing force applied to the material 12 to a value approximately equal to the coercive force. The current induced in the output loop will thus be proportional to the amount by which the input current exceeds the value required to produce a magnetizing force equal to the coercive force. Since the voltage induced around the loop is proportional to the rate of flux change, it follows that the current is also a function of the rate of flux change. Hence the rate of flux change is proportional to the amount by which the input current exceeds the amount required to produce a magnetizing force which is equal to the coercive force, and the analogy is complete. The output of this memory circuit is read in terms of the current rather than the voltage induced in the secondary coil. One convenient way of obtaining a reading of the current output pulse in this arrangement is by virtue of a current transformer 58, the primary 60 being in series with the coil 16 and the secondary 62 supplying the cathode ray tube 28, as seen in Figure 10. This discussion also assumes certain idealized conditions and characteristics in the various elements.

Throughout the foregoing description an oscilloscope 28 has been referred to as a means for reading out the stored information as represented by the magnetic state of the material. It will be appreciated that many methods may be used for observation of the magnetic state of the material and for application of the signal representative of the magnetic state of the material. The oscilloscope is essentially a means for one skilled in the art to obtain a visible observation of the output signals from the circuits.

Other variations include the use of reference (arbitrary zero) points other than limiting states in the region of saturation, re-set systems using the application of currents to exterior helixes, and the use of various types of associated means for indicating the degree of magnetization of the magnetic material.

Various methods may be used for adjusting the characteristics of specific memory units in terms of the characteristics of specific cores or to vary the characteristics of output signals including the winding of a special coil on the core with an associated selected resistance or impedance load (the limiting cases being a shorted turn or turns and an open circuit), and the use of series and/or shunt resistances or impedances in circuit with the input, output or other coils used in the system.

In accordance with the patent statutes, we have described the principles of construction and operation of our memory system, and while we have endeavored to set forth the best demonstrative embodiments thereof, we desire to have it understood that these are only illustrative thereof and that obvious changes may be made within the scope of the following claims without departing from the spirit of our invention.

We claim:

1. A memory storage system comprising a magnetizable element having a plurality of stable magnetic states between two stable limits, first means for applying a magnetizing force to said element of sufficient magnitude to change the state of magnetization from one limit of saturation to the other limit of saturation, and second means for applying a magnetizing force to said element of sufficient magnitude to change the state of magnetization from one limit of saturation to the other limit of saturation by discrete pulses each being so limited in time duration that the element is magnetized from a state set by said first means to a plurality of successive stable states between said limits of saturation, and means for rendering an indication of the magnetic change which takes place upon the application of each of said magnetizing forces.

2. A memory storage system as in claim 1, said first means comprising a first winding on said element and energizing means therefor, and said second means comprising a second winding on said core and energizing means therefor.

3. A magnetic storage system as in claim 1, further comprising third means for applying said first and second means in a mutually exclusive preferred direction of magnetization.

4. A magnetic storage system as in claim 3, further comprising anti-coincident circuit means connected to said first and second means and said rendering means, and automatic reset means controlled by said anti-coincident means and connected to said first and second means for automatically resetting said element to one limit of magnetic saturation when the opposite limit of saturation has been reached.

5. A memory storage system comprising a magnetizable element having a plurality of stable magnetic states between two stable limits, first means for applying a magnetizing force to said element of sufficient magnitude to change the state of magnetization from one limit of saturation to the other limit of saturation, second means for applying a magnetizing force to said element of sufficient magnitude to change the state of magnetization from one limit of saturation to the other limit of saturation by discrete pulses each being so limited in time duration that the element is magnetized from a state set by said first means to a plurality of successive stable states between said limits of saturation, means for rendering an indication of the magnetic change which takes place upon the application of each of said magnetizing forces as a signal indicative of the information stored, third means for applying said first and second means in a mutually exclusive preferred direction of magnetization, time delay means connected to said indication rendering means for storing said signal, and amplifier means joined between said time delay means and said first and second means for requantifying said signal.

6. In combination, a magnetic member having a continuous and homogeneous configuration and made from a material to provide a saturable characteristics for fluxes of a pair of opposite polarities and to provide remanent fluxes of stable characteristics at flux positions intermediate the saturable intensities, means for applying first signals of an intensity and duration to the magnetic member to produce saturating fluxes of a first polarity in the magnetic member, means for applying second signals of an intensity and duration to the magnetic member to change the magnetic level in the magnetic member from a saturating intensity of the first polarity to a level approaching the saturating intensity of second polarity, means for subsequently changing the flux level to a saturating intensity of the first or second polarity, and means associated with the last mentioned means for determining the amount of flux change to the saturating intensities of first or second polarities to provide an indication of the amount of flux produced in the magnetic member by the second signals.

7. In combination, a member having a homogeneous composition and a looped configuration and saturable with magnetic fluxes of first and second polarities and stable magnetically with fluxes of any intensity between the saturating levels of first and second polarity, means for saturating the magnetic member with fluxes of the first polarity, means for applying pulses of energy to the magnetic member of particular amplitudes, polarities and durations to change the level of magnetic flux from the first saturating intensity to a level approaching the saturating intensity of the second polarity, and means for providing an indication of the change of magnetic flux in the member from the first polarity.

8. In combination, a member saturable with magnetic fluxes of first and second polarities and having characteristics approaching a rectangle of flux intensity relative to coercive force and having stable magnetic characteristics at any flux intermediate the first and second saturating intensities, means for producing saturating flux of the first intensity in the magnetic member, means for applying signals having amplitudes and durations to produce changes in the flux in the magnetic member from the saturating intensity of first polarity to a level approaching the saturating intensity of second polarity, and means for indicating the changes in the fluxes in the magnetic member from the saturating intensity of first polarity.

9. In combination, a member saturable with magnetic fluxes of opposite polarities and having stable characteristics for the retention of magnetic fluxes at any intermediate level between the saturating intensities and having properties for producing substantially equal changes in flux intensities in the intermediate range of flux levels upon the imposition of signals of substantially equal volt-second characteristics to the member, means for producing saturating fluxes of the first intensity in the member, means for applying to the member signals having amplitudes at least as great as the coercive force required to change the flux level of the member and having volt-second characteristics for changing the flux level of the member from the saturating intensity of first polarity to the saturating intensity of second polarity or to an intermediate intensity, and means for providing an indication as to the change in the flux level from the saturating intensity of the first polarity.

10. In combination, a member having a homogeneous composition and a looped configuration and saturable with magnetic fluxes of opposite polarities and having properties of retaining magnetic fluxes at any intensity intermediate the first and second saturating intensities, means for producing magnetic fluxes of saturating intensity and of the first polarity in the magnetic member, means for producing discrete pulses each having intensity at least as great as the coercive force required to change the magnetic fluxes in the member and having volt-second characteristics for changing the flux in the member through only an intermediate magnetic distance between the first and second saturating flux intensities, and means for indicating the changes in the flux level in the magnetic member from the saturating intensity of first polarity.

11. In combination, a member saturable with magnetic fluxes of first and second polarities and having a homogeneous composition throughout its length and having properties of retaining magnetic fluxes at any intermediate level between the saturating intensities of first and second polarities, a first winding disposed in magnetic proximity to the magnetic member, means for introducing first signals to the first winding to produce saturating fluxes of the first polarity in the member, means for introducing to the first winding second signals having characteristics for producing flux changes in the magnetic member and having time durations for producing flux changes through only an intermediate distance between the first and second saturating intensities, a second winding disposed in magnetic proximity to the magnetic member for the induction of output signals upon changes in the flux level from the saturating intensity of first polarity and in accordance with such changes, and means connected to the second winding to provide an indication of the changes in the flux level of the magnetic member from the saturating intensities of first polarity in accordance with the voltages induced in the second winding.

12. In combination, a magnetic member saturable with magnetic fluxes of first and second polarities and having a homogeneous composition and properties of retaining fluxes at any level intermediate the first and second saturating intensities and having properties of receiving in the intermediate region flux changes substantially proportional in a direct relationship to the volt-seconds characteristics of the signals introduced to the member, means for producing saturating intensities of the first polarity in the member, a first winding magnetically coupled to the member, means for introducing to the first winding having amplitudes sufficiently great to produce changes in the flux level of the member and having durations sufficient only in producing changes in flux intensities intermediate the saturating intensities of first and second polarities, a second winding magnetically coupled to the member for the induction of signals upon changes of flux in the member, and means for producing changes of magnetic flux in the member to saturating intensities of the first polarity or the second polarity to provide indications of the amplitude and time characteristics of the signals introduced to the first winding.

13. In combination, a member saturable with magnetic fluxes of first and second polarities and having a homogeneous composition and configuration and having a substantially rectangular relationship of flux density with respect to any electromotive force applied to the member above a particular level, means for applying electromotive forces to the member to produce saturating fluxes of the first polarity in the member, a first winding disposed on the member, means for introducing to the first winding discrete pulses each having an amplitude for producing an electromotive force greater than the particular value and each having a time duration insufficient to produce in the member a flux change corresponding to the difference between the saturating levels, a second winding disposed on the member to produce output signals upon changes of flux in the member, and means for producing a change of flux level in the magnetic member to one of the saturating intensities upon the introduction of the discrete pulses for the production in the second winding of output signals indicative of the composite characteristics of the discrete pulses.

14. In combination, a member saturable with magnetic fluxes of first and second polarities and having a homogeneous composition and having a magnetic permeability approaching zero for flux levels at the saturating intensities and approaching infinity for flux levels between the saturating intensities to obtain changes in flux linearly related to the volt-seconds introduced to the core, means for introducing sufficient volt-seconds to the member to produce saturating fluxes of the first polarity in the magnetic member, a first winding disposed in magnetic proximity to the magnetic member, means for introducing to the magnetic member signals having amplitudes at least as great as the coercive force required to produce magnetic changes in the core and having durations less than that required to produce changes in the flux level from one saturating intensity to the other, a second winding disposed in magnetic proximity to the member for the induction of signals upon changes of magnetic flux in the member, and means for introducing volt-seconds to the first winding after the introduction of the signals to change the flux level in the member to saturating intensities of the first or second polarities, means for indicating the signals induced in the second winding upon the introduction of the last mentioned volt-seconds to the first winding to provide an indication of the signals previously introduced to the winding.

15. Apparatus as set forth in claim 7 in which means are included to reset the magnetic member to saturating fluxes of the first polarity upon changes of flux to a saturating intensity of the second polarity and in which means are included to produce output signals upon the resetting of the flux in the member to saturating intensities of the first polarity.

16. Apparatus as set forth in claim 6 in which the signals applied to the magnetic member cause the magnetic member to pass directly to the intermediate intensities from their previous flux level including the saturating intensities of first polarity.

17. Apparatus as set forth in claim 13 in which the magnetic member passes directly from the saturating intensities of first polarity to the intermediate flux levels upon the application of the signals to the first winding.

18. In combination, a member saturable with magnetic fluxes of first and second polarities and having characteristics approaching a rectangle of applied current relative to volt-seconds introduced to the member and having stable magnetic characteristic at any level of volt-seconds intermediate the first and second saturating intensities, means for producing saturating fluxes of the first intensity in the magnetic member, a first winding magnetically coupled to the member, means for applying to the first winding signals having volt-second characteristics to produce changes in the flux in the magnetic member from the saturating intensity of first polarity to a level approaching the saturating intensity of second polarity, means for subsequently applying to the first winding volt-seconds sufficient to produce saturating fluxes in the magnetic member, a second winding magnetically coupled to the magnetic member, and means for indicating the duration of the signal induced in the second winding during the introduction to the first winding of the last-mentioned volt-seconds to provide a determination of the volt-seconds introduced to the core by the signals.

19. In combination, a member saturable with magnetic fluxes of first and second polarities and having a homogeneous composition and having a magnetic permeability approaching zero for flux levels at the saturating intensities and approaching infinity for flux levels between the saturating intensities to obtain flux changes linearly related to the volt-seconds introduced to the core, means for introducing sufficient volt-seconds to the member to produce saturating fluxes of the first polarity in the magnetic member, means for introducing to the magnetic member signals having volt-seconds at least as great as the coercive force required to produce magnetic changes in the core and less than that required to produce changes in the flux level from one saturating intensity to the other, means for introducing volt-seconds to the magnetic member after the introduction of the signals to change the flux level in the member to saturating intensities of the first or second polarities, and means for measuring the duration of time required to produce saturation of the member by the last mentioned means for an indication of volt-seconds introduced to the member by the signals.

20. In combination, a member saturable with magnetic fluxes of first and second polarities and having a homogeneous composition and configuration and having a substantially linear relationship of flux density with respect to any electromotive force applied to the member above a particular level, means for applying electromotive forces to the member to produce saturating fluxes of the first polarity in the member, a first winding disposed on the member, means for introducing to the first winding volt-seconds insufficient to produce in the magnetic member a flux change corresponding to the difference between the saturating levels but sufficient to change the flux in the member from the saturating intensity of first polarity, a second winding disposed on the member to produce output signals upon changes of the volt-seconds level in the member, means for subsequently introducing to the first winding volt-seconds sufficient to produce saturating fluxes in the member, and means for measuring in the secondary winding the duration of time required for the last mentioned means to produce saturating fluxes in the member for a determination of the volt-seconds in the core before such saturation.

21. In combination, a member saturable with magnetic fluxes of opposite polarities and having stable characteristics for the retention of magnetic fluxes at any intermediate level between the saturating intensities and having properties for producing substantially equal changes in flux intensities in the intermediate range of flux-levels upon the imposition of signals of substantially equal volt-second characteristics to the member, means for producing saturating fluxes of the first intensity in the member, means for applying to the member signals having amplitudes at least as great as the coercive force required to change the flux level of the member and having volt-second characteristics for changing the flux level of the member from the saturating intensity of first polarity to a level approaching the saturating intensities of second polarity, means for subsequently applying volt-seconds to the member to produce a saturating flux in the member, and means for measuring the duration of time required for the last mentioned means to produce a saturating intensity for an indication of the volt-seconds in the member before such saturation.

22. In combination, a member saturable with magnetic fluxes of first and second polarities and having properties of retaining on a residual basis volt-seconds introduced to the member and having a rectangular response curve of current relative to volt-seconds stored in the core to obtain a continued storage of volt-seconds in the member with a substantially constant current for a limited period of time and thereafter to obtain substantially a zero storage of volt-seconds regardless of the continued application of current or of any increases in current, means for initially introducing volt-seconds to the core to obtain a saturation of the core with fluxes of the first polarity, a first winding disposed in magnetic proximity to the magnetic member, means for applying a plurality of discrete pulses of voltage to the first winding to bring the volt-seconds in the magnetic member to an intermediate level between the first and second saturating intensities, a second winding disposed in magnetic proximity to the magnetic member, means for thereafter applying to the first member voltage-seconds having a substantially constant rate and sufficient duration to bring the magnetic member to one of the saturating intensities, and means for indicating the duration of the voltage pulse induced in the second winding during the application of volt-seconds to the magnetic member by the last mentioned means to provide a determination of the volt-seconds introduced to the core by the plurality of discrete pulses.

23. In combination, a magnetic member having a continuous and homogeneous configuration and made from a material to provide saturable characteristics for fluxes of a pair of opposite polarities and to provide remanent fluxes of stable characteristics at flux positions intermediate the saturable intensities, means for applying first signals of an intensity and duration to the magnetic member to produce saturating fluxes of a first polarity in the magnetic member, means for applying second signals of an intensity and duration to the magnetic member to change the magnetic level in the magnetic member from a saturating intensity of the first polarity to a level approaching the saturating intensity of second polarity, means for subsequently resetting the flux level to a saturating intensity of the first polarity, means associated with the last mentioned means for determining the amount of flux change to the saturating intensity of first polarity to provide an indication of the amount of flux produced in the magnetic member by the second signals, and means operative upon an indication of the flux level in the member to provide a return to the member of the flux level which the member had before the resetting operation.

24. In combination, a magnetic member saturable with magnetic fluxes of first and second polarities and having a homogeneous composition and properties of retaining fluxes at any level intermediate the first and second saturating intensities and having properties of receiving in the intermediate region flux changes substantially proportional in a direct relationship to the volt-seconds characteristics of the signals introduced to the member, means for producing saturating intensities of the first polarity in the member, a first winding magnetically coupled to the member, means for introducing to the first winding signals having amplitudes sufficiently great to produce changes in the flux level of the member and having durations sufficient only in producing changes in flux intensities intermediate the saturating intensities of first and second polarities, a second winding magnetically coupled to the member for the induction of signals upon changes of flux in the member, means for producing changes of magnetic flux in the member to saturating intensities of the first polarity or the second polarity to provide indications of the amplitude and time characteristics of the signals introduced to the first winding, an anti-coincidence circuit for producing signals only upon the introduction of signals to the first winding without the simultaneous induction of signals in the second winding, and means associated with the anti-coincidence circuit for introducing signals to the first winding to reset the magnetic member to saturating flux levels of the first polarity upon the production of signals by the anti-coincidence circuit.

25. In combination, a member saturable with magnetic fluxes of first and second polarities and having a homogeneous composition and having a magnetic permeability approaching zero for flux levels at the saturating intensities and approaching infinity for flux levels between the saturating intensities to obtain changes in flux linearly related to the volt-seconds introduced to the core, means for introducing sufficient volt-seconds to the member to produce saturating fluxes of the first polarity in the magnetic member, a first winding disposed in magnetic proximity to the magnetic member, means for introducing to the magnetic member signals having amplitudes at least as great as the coercive force required to produce magnetic changes in the core and having durations less than that required to produce changes in the flux level from one saturating intensity to the other, a second winding disposed in magnetic proximity to the member for the induction of signals upon changes of magnetic flux in the member, means for introducing volt-seconds to the first winding after the introduction of the signals to reset the flux level in the member to saturating intensities of the first polarity, means for indicating the signals induced in the second winding upon the introduction of the last mentioned volt-seconds to the first winding to provide an indication of the signals previously introduced to the winding, means for delaying the signals induced in the second winding upon the introduction of the resetting signals to the first winding, and means for introducing the delayed signals back to the first winding to return the magnetic member back to the flux level which it had before the introduction of the resetting signals to the winding.

References Cited in the file of this patent

UNITED STATES PATENTS

| | | |
|---|---|---|
| 1,574,350 | Johnson | Feb. 23, 1926 |
| 2,337,231 | Cloud | Dec. 21, 1943 |
| 2,430,457 | Dimond | Nov. 11, 1947 |
| 2,519,513 | Thompson | Aug. 22, 1950 |

OTHER REFERENCES

"Static Magnetic Storage and Delay," An Wang et al., Journal of Applied Physics, vol. 21, January 1950, pp. 49–54.

"Static Magnetic Memory for Low-Cost Computers," Kincaid et al., Electronics, January 1951.

"A Magnetic Scaling Circuit," by H. Hertz, Journal of Applied Physics, vol. 22, pages 107 to 108, January 1951.